(12) United States Patent
Nazzal (10) Patent No.: US 7,698,730 B2
(45) Date of Patent: Apr. 13, 2010

(54) SERVICE DETECTION

(75) Inventor: Robert N. Nazzal, Watertown, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 1151 days.

(21) Appl. No.: 10/803,167

(22) Filed: Mar. 16, 2004

(65) Prior Publication Data

US 2005/0206650 A1    Sep. 22, 2005

(51) Int. Cl.
*H04L 29/00* (2006.01)

(52) U.S. Cl. .............................. 726/1; 726/23; 726/25; 726/26; 709/224

(58) Field of Classification Search ...................... 726/1, 726/23, 26, 25; 709/224
See application file for complete search history.

(56) References Cited

U.S. PATENT DOCUMENTS

| | | | | | |
|---|---|---|---|---|---|
| 5,892,903 | A * | 4/1999 | Klaus | ........................... | 726/25 |
| 5,915,087 | A * | 6/1999 | Hammond et al. | ............ | 726/12 |
| 5,999,179 | A * | 12/1999 | Kekic et al. | ................. | 715/734 |
| 6,578,077 | B1 * | 6/2003 | Rakoshitz et al. | ........... | 709/224 |
| 6,628,835 | B1 * | 9/2003 | Brill et al. | .................... | 382/226 |
| 6,907,533 | B2 * | 6/2005 | Sorkin et al. | ................... | 726/22 |
| 7,031,267 | B2 * | 4/2006 | Krumel | ....................... | 370/255 |
| 7,036,013 | B2 * | 4/2006 | Renganarayanan et al. | . | 713/178 |
| 7,047,288 | B2 * | 5/2006 | Cooper et al. | ............... | 709/223 |
| 7,103,913 | B2 * | 9/2006 | Arnold et al. | .................. | 726/22 |
| 7,117,276 | B2 * | 10/2006 | Maeda et al. | ................. | 710/36 |
| 7,152,239 | B1 * | 12/2006 | Lyle et al. | ....................... | 726/3 |
| 7,152,242 | B2 * | 12/2006 | Douglas | ....................... | 726/23 |
| 7,219,239 | B1 * | 5/2007 | Njemanze et al. | .............. | 726/3 |
| 7,231,667 | B2 * | 6/2007 | Jordan | .......................... | 726/23 |
| 7,290,283 | B2 * | 10/2007 | Copeland, III | .............. | 726/25 |
| 7,486,673 | B2 * | 2/2009 | Harijono et al. | .............. | 370/389 |
| 7,492,720 | B2 * | 2/2009 | Pruthi et al. | ................. | 370/252 |
| 2003/0145225 | A1 * | 7/2003 | Bruton et al. | ............... | 713/201 |
| 2004/0010718 | A1 * | 1/2004 | Porras et al. | ................. | 713/201 |
| 2004/0015582 | A1 * | 1/2004 | Pruthi | ......................... | 709/224 |
| 2004/0064555 | A1 * | 4/2004 | Cuny et al. | .................. | 709/225 |
| 2004/0117478 | A1 * | 6/2004 | Triulzi et al. | ................. | 709/224 |
| 2004/0255162 | A1 * | 12/2004 | Kim et al. | .................... | 713/201 |
| 2005/0005169 | A1 * | 1/2005 | Kelekar | ....................... | 713/201 |

OTHER PUBLICATIONS

Alfonso Valdes and Keith Skinner; "Adaptive, Model-Based Monitoring for Cyber Attack Detection"; Springer-Verlag Berlin Heidelberg 2000; pp. 80-93.*

Veizades et al; "Service Location Protocol"; Network Working Group J. Veizades; Request for Comments: 2165; Jun. 1997; "http://www.ietf.org/rfc/rfc2165.txt" 90 Pages.*

* cited by examiner

*Primary Examiner*—Carl Colin
(74) *Attorney, Agent, or Firm*—Park, Vaughan & Fleming LLP (57) ABSTRACT

A new service detection process in a network retrieves a baseline list of port protocols used by a entity being tracked. The baseline value is determined over a baseline period. A current list of port protocols for the entity being tracked is also retrieved and is compared to determine whether there is a difference in the port protocols, by having a protocol that was in a current list but was not in the baseline list. If there is a difference the process indicates a new service involving the tracked entity.

11 Claims, 11 Drawing Sheets

| Time Slice | Fri | Thu | Wed | ... | Sun | Sat | Fri |
|---|---|---|---|---|---|---|---|
| Services provided by A (Web Server) to B (Desktop) | | | | | | | |
| WWW (TCP:80) | | | | | | | |
| Bytes / sec | 2k | 3k | 1k | ... | 2k | 4k | 3k |
| Packets / sec | 5 | 6 | 2 | | 5 | 9 | 5 |
| Conn's. / hr | .3 | .5 | .3 | | .2 | .3 | .3 |
| SSH (TCP:22) | | | | | | | |
| Bytes / sec | 1k | 3k | 4k | ... | 1k | 2k | 3k |
| Packets / sec | 2 | 6 | 9 | | 2 | 5 | 6 |
| Conn's. / hr | .3 | .5 | .3 | | .3 | .3 | .5 |
| Services provided by B (Desktop) to A (Web Server) | | | | | | | |
| SSH (TCP:22) | | | | | | | |
| Bytes / sec | 21k | 0 | 0 | ... | 0 | 0 | 0 |
| Packets / sec | 10 | 0 | 0 | | 0 | 0 | 0 |
| Conn's. / hr | 1 | 0 | 0 | | 0 | 0 | 0 |

SERVICE DETECTION

BACKGROUND

This invention relates generally to network management.

Enterprises have internal networks (intranets) that handle communications throughout an entire geographically dispersed organization. Managing such networks is increasingly costly, and the business cost of network problems increasingly high. Managing an enterprise network involves a number of inter-related activities including establishing a topology, establishing a policy and monitoring network performance. Network topology can have a significant impact on the cost of building a network and on the performance of the network once it has been built. An increasingly important aspect of topology design is network segmentation. In an effort to provide fault isolation and mitigate the spread of worms, enterprises segment their networks using firewalls, routers, VLANs and other technologies. Operators monitor network performance. Almost every complex network suffers from various localized performance problems. Network managers detect these problems and take action to correct them.

Another aspect of network management is detecting and dealing with security violations. Increasingly, networks are coming under attack. Sometimes the targets are chosen at random (e.g. most virus-based attack). Sometimes the targets are chosen intentionally (e.g., most denial of service attacks). These attacks often involve compromised computers within the enterprise network. Early detection of attacks plays a critical role in reducing damage to networks and systems coupled to the networks.

SUMMARY

According to an aspect of the invention, a graphical user interface for an intrusion detection system, used in configuring a new service detection process, includes a first field that depicts choices for entities to track in the network and a second field that allows a system to track if the selected entity is providing or consuming a service. The interface includes a third field that depicts a range over which to track an entity selected in the first field and a fourth field to specify a severity for an alert generated if a new service is detected.

Other embodiments include the graphical user interface of having the fields linguistically tied together on the interface to form a sentence that corresponds to a rule. The graphical user interface could include a list of new service detection rules stored in the detection system. The first field of the graphical user interface allows a user to specify entity to track as "a specific host", "any host in a specific role", "any host in a specific segment" or "any host." The third field of the graphical user interface of claim specifies details for the extent of the comparison for the entity specified in the first field as "host", "in its role", "in its segment" or "anywhere" in the network. The graphical user interface allows a user to enter event severity as a numerical value. The graphical user interface has the fields implemented a pull-down fields.

According to an additional aspect of the invention, a method includes retrieving a baseline list of port protocols used by a entity being tracked, the baseline value determined over a baseline period, retrieving a current list of port protocols for the entity being tracked and determining whether there is a difference in the port protocols, by having a protocol that was in a current list but was not in the baseline list; and if there is a difference, indicating a new service involving the tracked entity.

According to an additional aspect of the invention, a computer program product residing on a computer readable medium for detection of new services in a network, the computer program product includes instructions for causing a computer to retrieve a baseline list of port protocols used by a entity being tracked, the baseline value determined over a baseline period, retrieve a current list of port protocols for the entity being tracked, and determine whether there is a difference in the port protocols, by having a protocol that was in a current list but was not in the baseline list; and if there is a difference. The program also includes instructions to indicate a new service involving the tracked entity.

One or more advantages can be provided from aspects of the invention. The process can discover that a host or group of hosts is "providing" or "using" a service that is new to that host or group of hosts. The new service detection process can configure rules to detect when a specific host, any host in a specific role, any host in a specific segment, any host, and so forth is "providing" or "consuming" a new service (using a new port protocol). Similarly, the extent of the comparison can be configured to determine if the new service is unprecedented for the entity being track for that entity, in its role, in its segment or anywhere in the network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
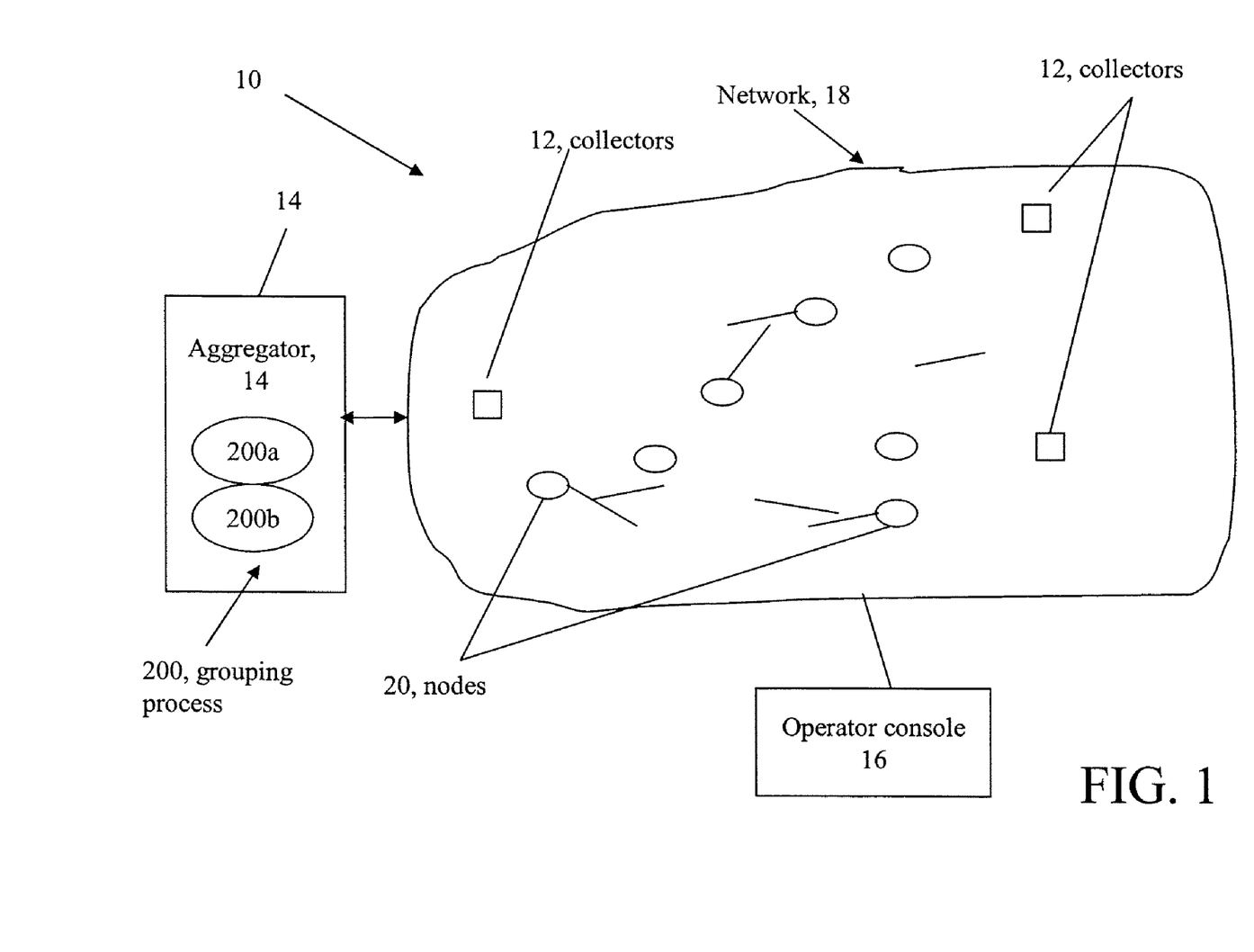
FIG. 1 is a block diagram of a network including anomaly detection.

Referring to FIG. 1, an anomaly detection system 10 to detect anomalies and process anomalies into events is shown. The anomaly detection system 10 can be used to detect denial of service attacks (DoS attacks), unauthorized access attempts, scanning attacks, worm propagation, network failures, and addition of new hosts in a network 18. In addition, the anomaly detection system 10 can detect that a host or group of host, etc. is providing and/or using a new service. The system 10 includes collector devices 12 and at least one aggregator device 14 and an operator console 16 that communicates with and can control collector devices 12 and the at least one aggregator device 14. The collector devices 12 and the at least one aggregator 14 are disposed in the network 18. The collector devices 12 connect to network devices, 15 e.g., switches, hosts, routers, etc. in line, or via a tap, e.g., using mirror, SPAN ports or other passive link taps. The collector devices 12 collect information such as source and destination addresses, transport protocol, source and destination ports, flags, and length. Periodically, the collector devices 12 send to the aggregator 14 a record of the number of packets, bytes, and connections between every host pair observed by the collector 12, broken down by port and protocol. In addition, the collector devices 12 send summary information concerning flags seen on TCP packets.

The aggregator 14 can also execute a grouping process 200 that efficiently partitions hosts on a network into groups in a way that exposes the logical structure of the network 18. The grouping process 200 assigns nodes 20 to groups and includes a classification process 200a that classifies hosts by groups and a correlation process 200b that correlates groups. Details of the grouping process are discussed in a paper by Godfrey Tan, Massimiliano Poletto, John V. Guttag, M. Frans Kaashoek entitled "Role Classification of Hosts Within Enterprise Networks Based on Connection Patterns" USENIX Annual Technical Conference, General Track 2003: 15-28. Other role grouping techniques are possible.

Figure 2:
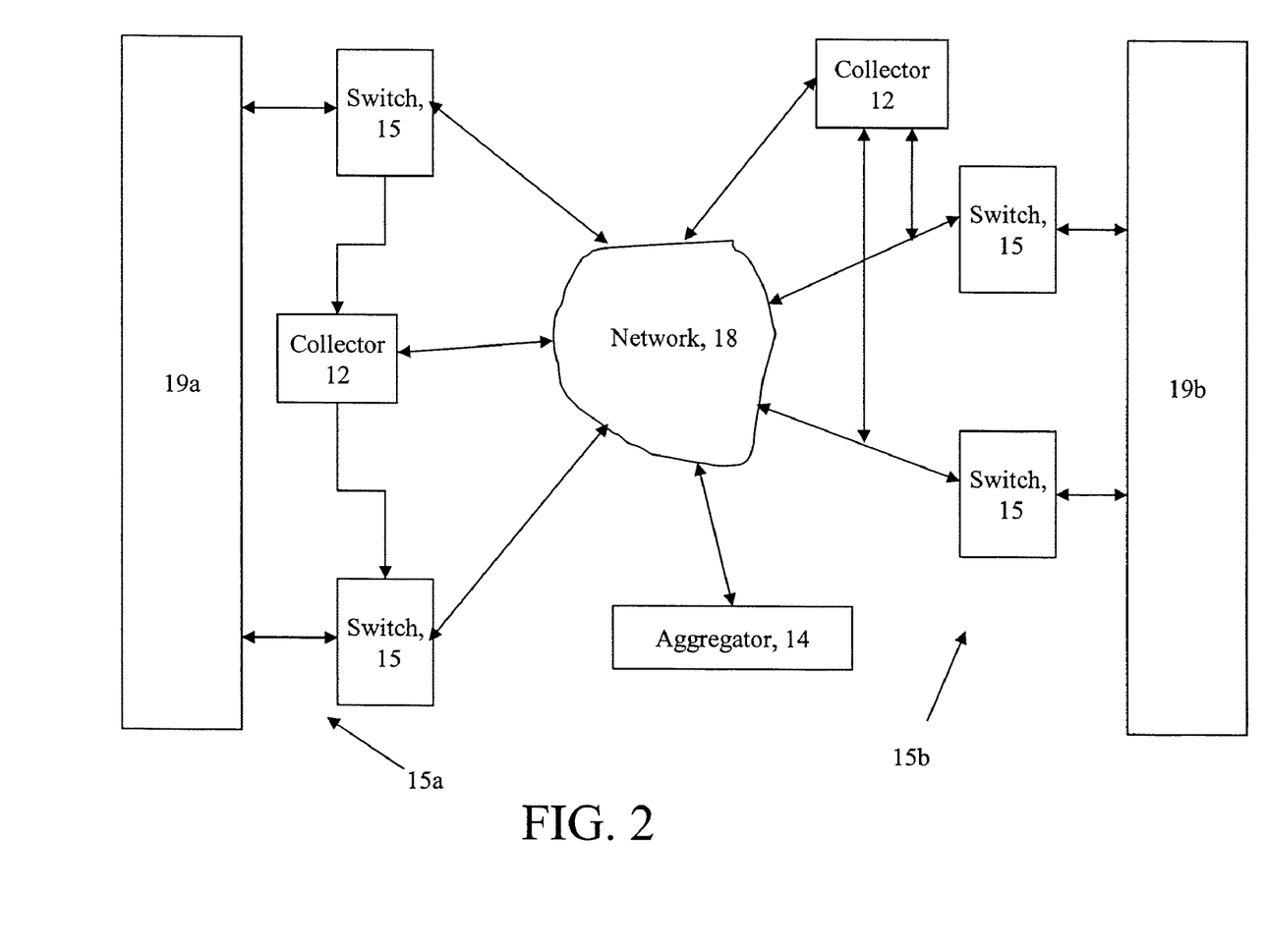
FIG. 2 is a block diagram depicting exemplary details of anomaly detection.

Referring to FIG. 2, collectors 12 are shown disposed to sample or collect information from network devices 15, e.g., switches as shown. The collector devices 12 send the information to the aggregator 14 over the network 18. The collectors 12 in one configuration 15a sample all traffic from a downstream network 19a provided that the traffic traverses the switches 15, whereas in another configuration 15b the collectors 12 sample traffic from downstream network 19b that enters and leaves the switches 15.

The architecture is based on an examination of current bytes/second, packets/second, connections/hour statistics, and so forth. The architecture compares these to historical data. The data collectors are devices that are coupled actively or passively on a link and collect the above mentioned as well as other statistics. Data collects 12 can be connected via a tap or can span port on a monitored device (e.g., router, etc.) over intervals of time. Over such intervals of time, e.g., every 30 seconds, the data collectors 12 send reports (not shown) to an aggregator. The report can be sent from the data collector to the aggregator over the network being monitored or over a hardened network (not shown).

There are a defined number of sources, a defined number of destinations, and a defined number of protocols on a given network. Over a defined interval (typically 30 seconds), the data collectors 12 monitor all connections between all pairs of hosts and destinations using any of the defined protocols. At the end of each interval, these statistics are summarized and reported to the aggregator 14. The values of the collected statistics are reset in the data collectors after reporting. The number of connections between ports using an unknown protocol is also monitored.

If more than one data collector saw the same source and destination communicating, the following could have occurred. The data collectors could be in parallel and each saw a portion of the communication. Alternatively, the data collectors could be in series and both data collectors saw the entire communication. Given the rate at which parallel connections may change, the aggregator assumes that the data collectors are in a series connection. The maximum of two received values is taken as a value for the connection and it is assumed that the lower value reflects dropped packets. Other arrangements are possible.

Figure 3:
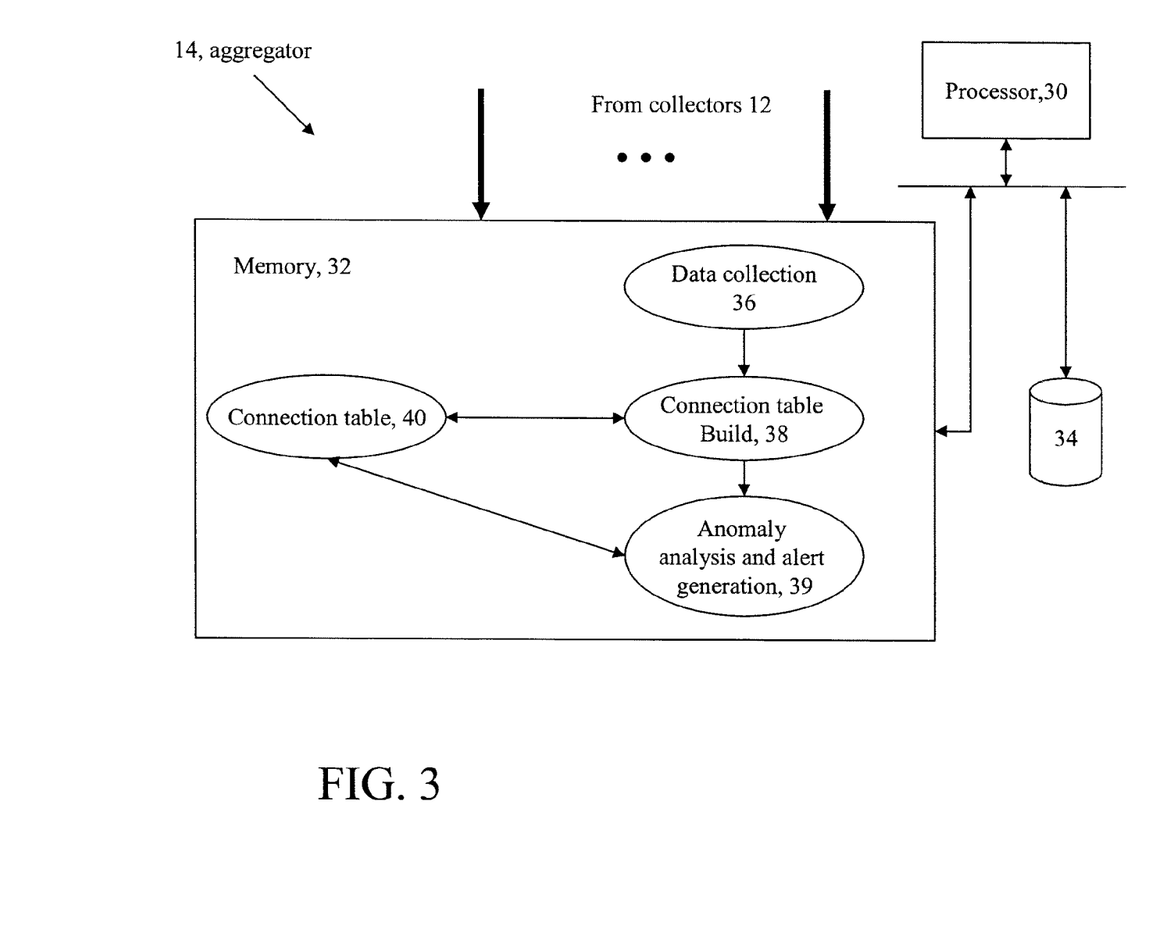
FIG. 3 is a block diagram depicting an aggregator.

Referring to FIG. 3, the aggregator 14 is a device (a general depiction of a general purpose computing device is shown) that includes a processor 30 and memory 32 and storage 34.

Other implementations such as Application Specific Integrated Circuits are possible. The aggregator 14 includes a process 36 to collect data from collectors 12 and a process 38 to produce a connection table 40. In addition, the aggregator 14 includes anomaly analysis and alert generation process 39 to detect anomalies and process anomalies into events that are reported to the operator console or cause the system 10 to take action in the network 18. Anomalies in the connection table can be identified as events including denial of service attacks, unauthorized access attempts, scanning attacks, worm propagation, network failures, addition of new hosts, and so forth.

Figure 4:
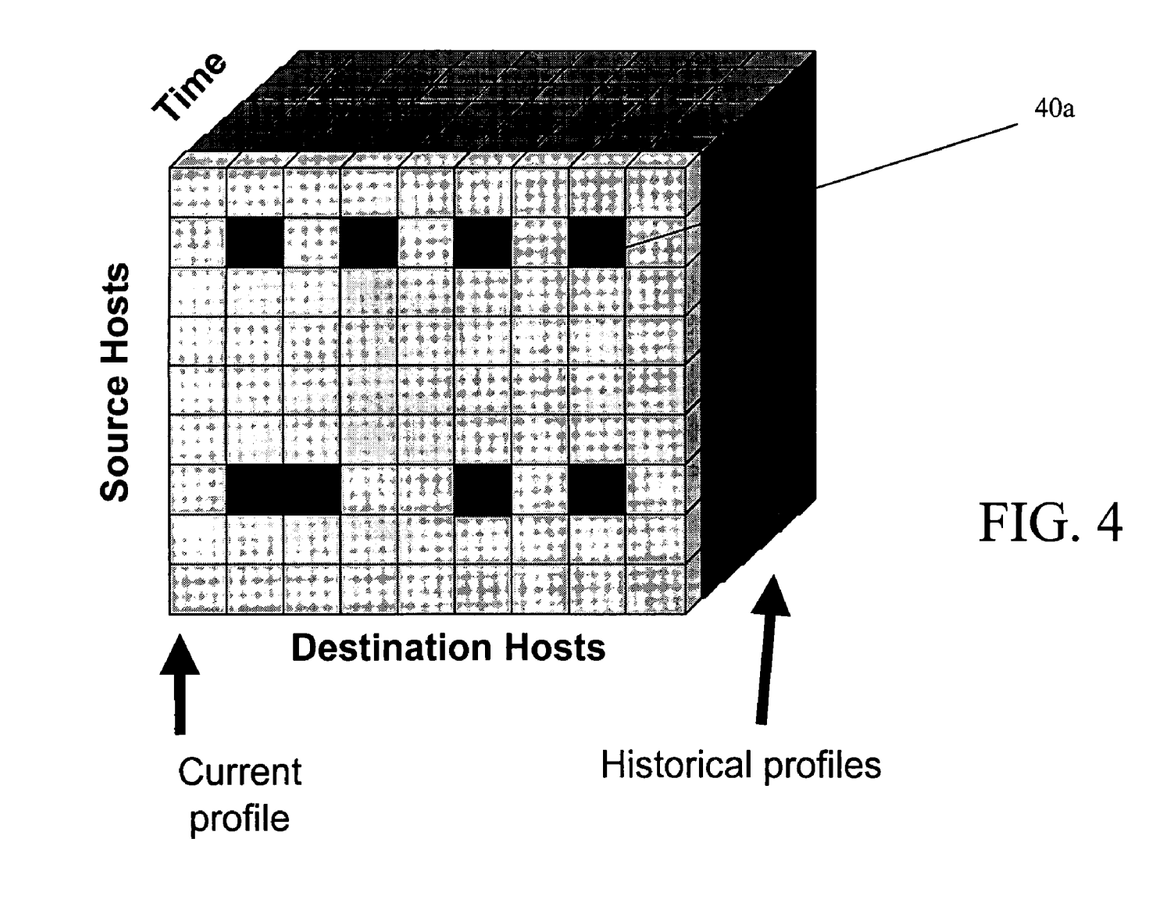
FIG. 4 is a block diagram depicting a connection table.

Referring to FIG. 4, the connection table 40 is a data structure that maps each host (e.g., identified by IP address) to a "host object" that stores information about all traffic to or from that host. In one implementation of the table, source address is one dimension, destination is a second dimension and time is a third dimension. The time dimension allows a current record and historical records to be maintained.

Using IP addresses to uniquely identify hosts could be inadequate in environments with dynamic DHCP assignments. Thus alternatively, the administrator can configure a DHCP server to produce a MAC address to IP address map. The MAC address to IP address map is sent as a flat file to the aggregator 14. Thereafter, when a data collector 12 reports an IP address and counter to/from values, the aggregator 14, for each IP address checks in the most recent map. If the IP address is found in the map, then the host is managed by a DHCP server and the host ID is the host's MAC address, otherwise the Host ID is the host IP address.

The host object, e.g., 40a of a host "A" also maps any host (IP address) "B" with which "A" communicates to a "host pair record" that has information about all the traffic from "A" to "B" and "B" to "A". This two-level map enables the system 10 to efficiently obtain summary information about one host and about the traffic between any pair of hosts, in either direction.

Hashing is used to "lookup or update" information about any host or host pair on the network 18. The connection table 40 includes additional structure to allow efficient traversal of all hosts or host pairs and supports efficient representation of groups of related hosts, e.g., a role grouping mechanism as discussed below. Alternatively, the role grouping can be stored separately from the connection table.

The connection table uses a hash map from host identifiers (IP or MAC addresses) to "Host" objects, as discussed. Each Host object maintains aggregate traffic statistics for the associated host ("H"), and a hash map (a 2nd level hash map) from host identifiers (IP addresses) of peers of host H (i.e., hosts that host H had communicated with) as "HostPair" objects. Each HostPair object maintains traffic statistics for each pair of hosts (H and H's peer). To allow more efficient, analysis HostPair objects are duplicated across Host objects. For instance, the HostPair "AB" is maintained both in the hash map within Host "A" and in the hash map within Host "B." Group information is embedded in the connection table, with each Host object storing information about the group that the associated host belonged to. The connection table maintains a list of all groups and their member hosts.

Figure 4A:
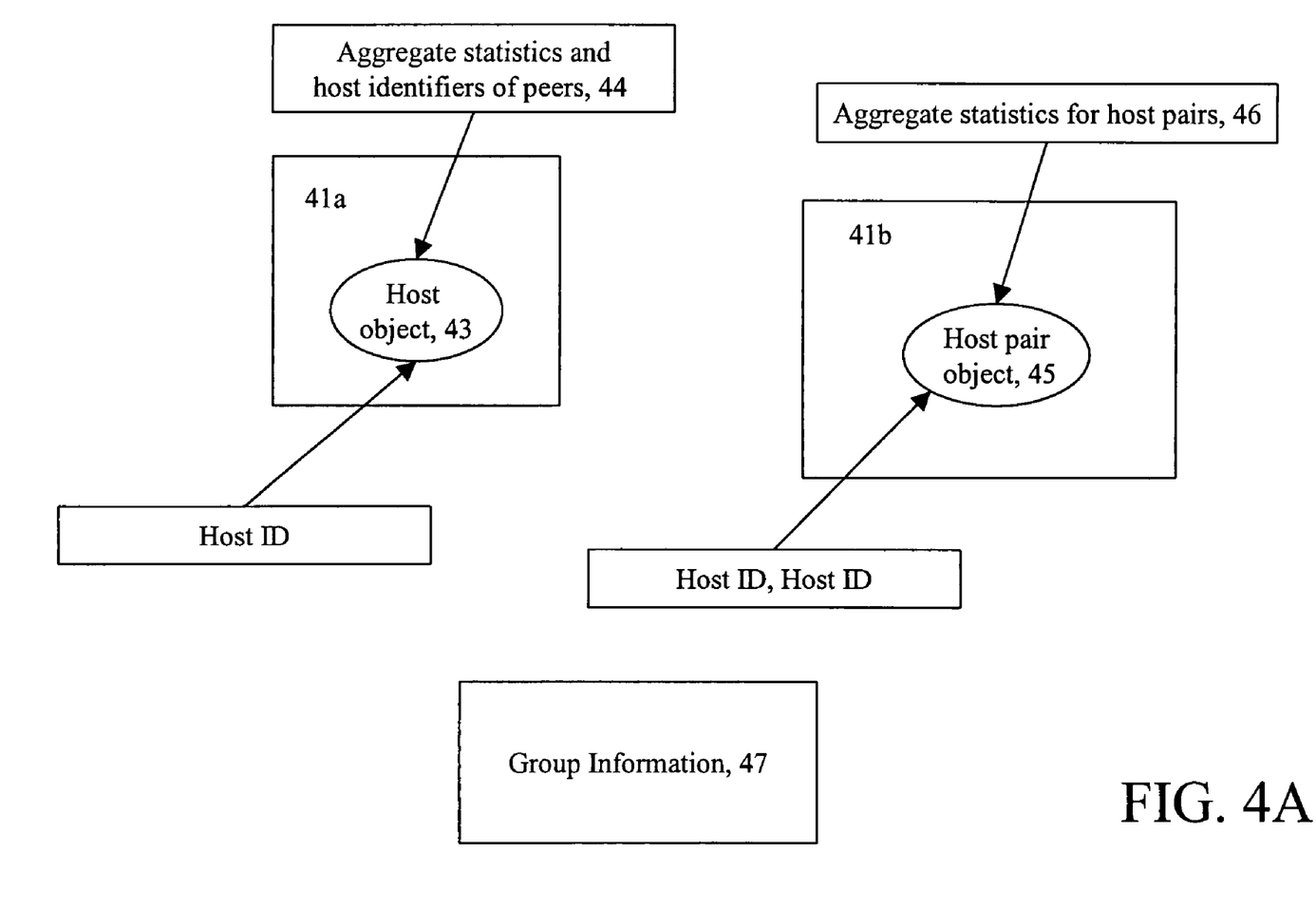
FIG. 4A is a block diagram of an alternative connection table.

Referring to FIG. 4A, in an alternative implementation 41 of the connection table 40, the connection table 41 is split into two hash maps 41a and 41b, a "host hash" map 41a and a "host pair" hash map 41b. The "host hash" map 41a maps host identifiers (IP or MAC addresses) to new Host objects 43. Each new Host object 43 has the aggregate traffic statistics for the associated host, as well as a list of the host identifiers (IP or MAC addresses) of all the peers of that host 44. The "host pair" hash map 41b maps pairs of host identifiers to Host Pair objects 45 that maintain traffic statistics 46 for pairs of hosts. In this implementation Host Pair objects 45 need not be longer duplicated, as discussed above.

For example, if host A and host B communicate, then the host map has a Host object 43 for A that lists B as a peer, the host map has a Host object 43 for B that lists A as a peer, and the host pair map has a Host Pair object 45 for AB. Group information is stored in a separate table 47 that is loaded, saved, and otherwise managed separately from the traffic statistics in the connection table. It does not need to be in memory unless it is actually needed.

Factoring out the group information and moving from many hash maps (top level map, plus one 2nd level map per Host object) to just two makes this implementation of the connection table more compact and decreases memory fragmentation, improving aggregator performance and scalability.

In one embodiment, only "internal hosts" (defined based on configurable IP address ranges) are tracked individually as described above. The aggregator 14 buckets all other ("external") hosts into a fixed number of bins according to 8- or 16-bit CIDR (Classless Inter-domain Routing) prefix. This approach preserves memory and computational resources for monitoring of the internal network 18 but still provides some information about outside traffic. Other arrangements are possible, for instance bucketing can be turned off if desired, so that each external host is tracked individually.

Figure 5:
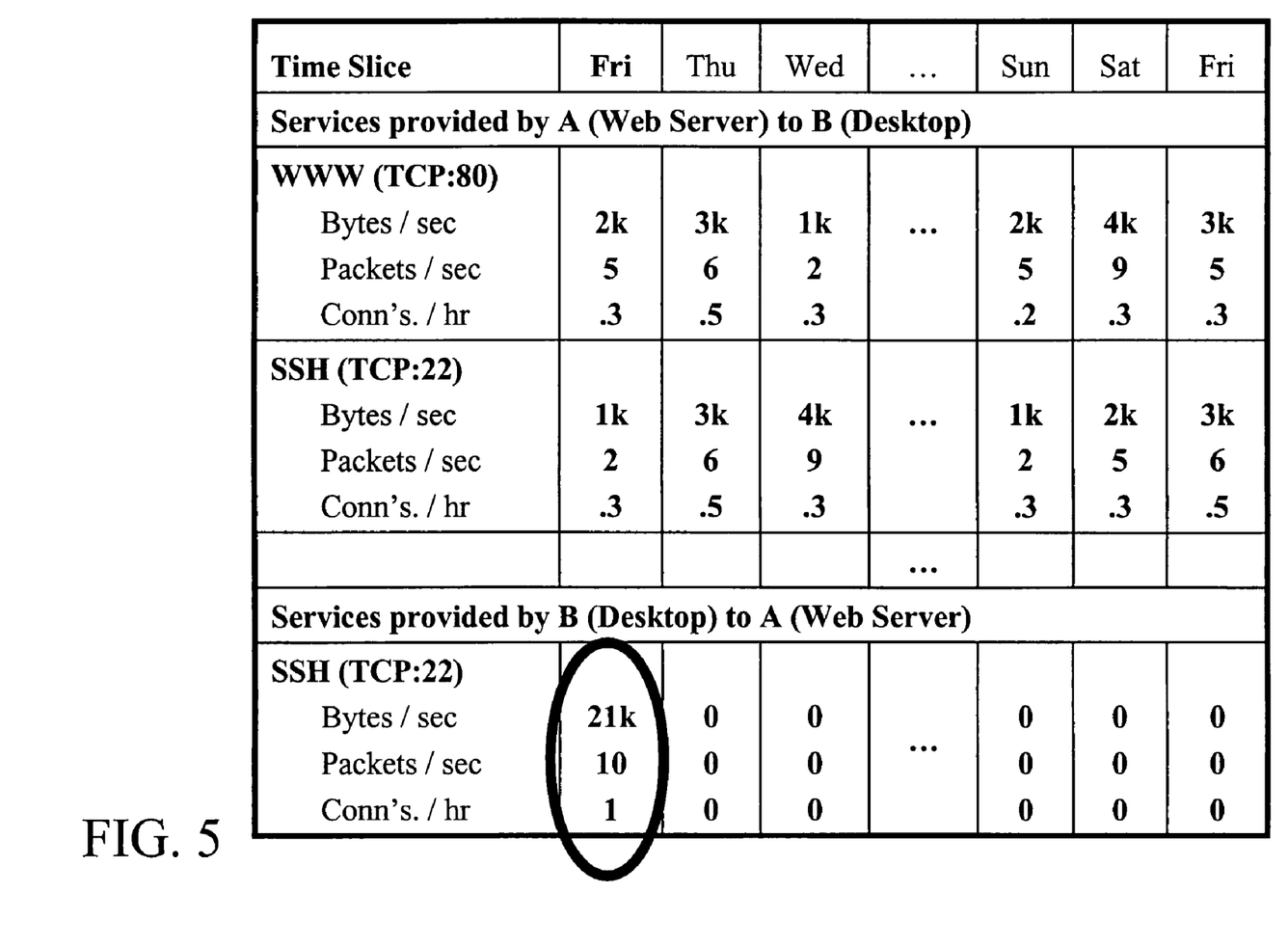
FIG. 5 is a block diagram depicting a record in the connection table.

Referring to FIG. 5, exemplary contents of the host object 40a are depicted. Similar statistics can be collected for host objects 43. As shown, the contents of the host object 40a in the connection table 40 include a measure of the number of bytes, packets, and connections that occurred between hosts during a given time-period, here on a daily basis. Data is broken down per-protocol for every well-known transport protocol (e.g., TCP, UDP, ICMP, and the 132 others defined by the "Internet Assigned Numbers Authority" and for several hundred well-known application-level protocols (e.g., SSH, HTTP, DNS, and so forth). For every application-level protocol, and for every pair of hosts "A" and "B", the Connection Table stores statistics for traffic from host A to host B and from host B to host A both for the case where "A" is the server and the case where "B" is the server. Unknown protocols are counted together.

Since most hosts only use a small fraction of the well-known protocols, the footprint of the data structure is kept manageable by storing protocol-specific records as (protocol, count) key-value pairs. Further, since the protocol distribution is typically skewed (a few protocols account for the majority of traffic on each host), key-value pairs are periodically sorted by frequency to improve amortized update time.

Individual host records have no specific memory limit. If a particular host connects with many other hosts and uses many protocols, all that information will be recorded. However, the total memory used by the Aggregator 14 is bounded in order to avoid denial of service attacks on the Aggregator 14. For example, an attacker spoofing random addresses can cause the Aggregator 14 to allocate new host structures and quickly consume memory. If an Aggregator ever exceeds a memory utilization threshold "m_{hi}", it de-allocates records until its memory utilization falls below "m_{hi}". Several different algorithms can be used for picking records to de-allocate. Some of the algorithms that can be used include random eviction, picking low-connectivity hosts first, high-connectivity hosts first, and most recently added hosts first. Similar measures are also taken on the probes 12 to ensure high performance and limit Probe-Aggregator communication overhead.

Figure 6:
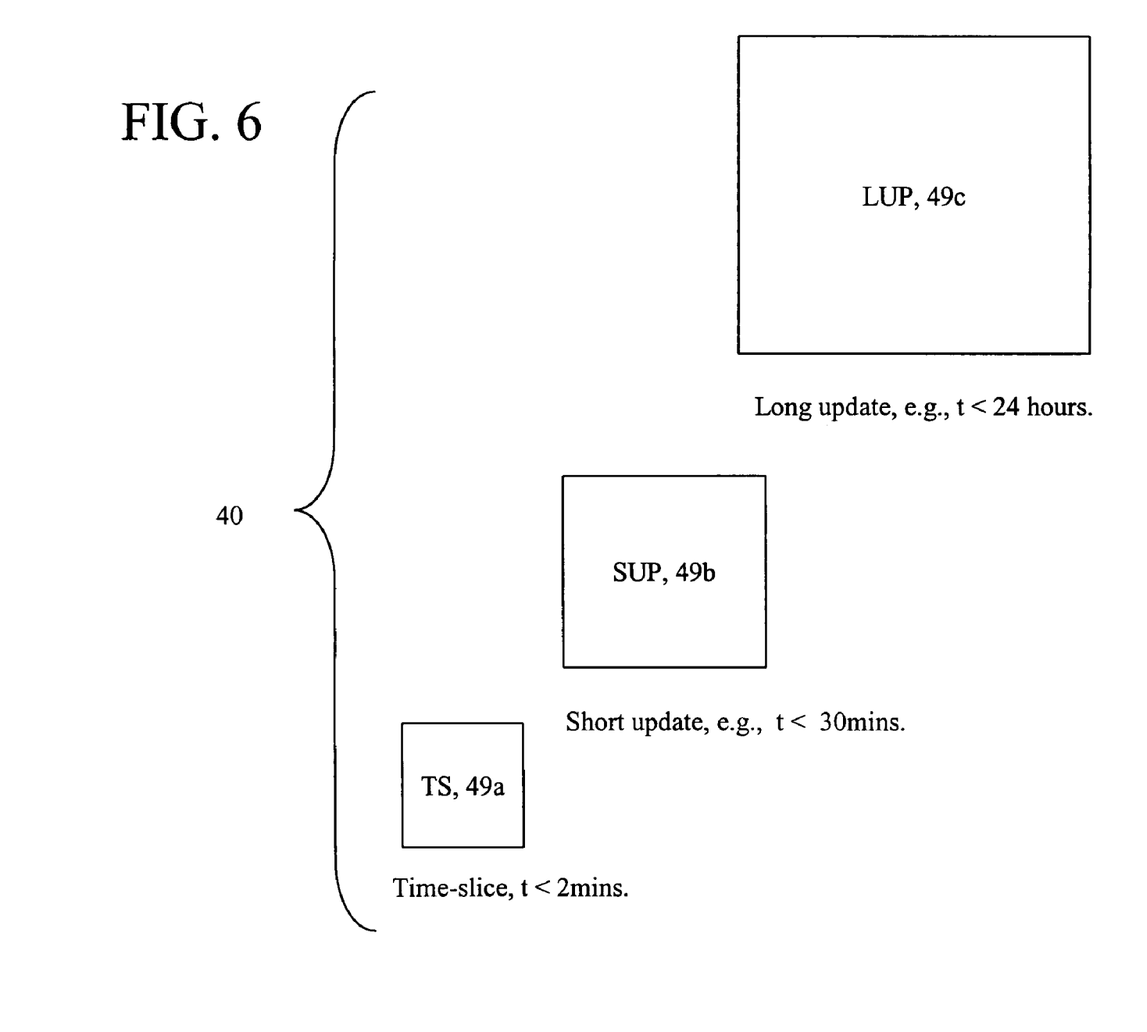
FIG. 6 is a block diagram depicting an arrangement of connection tables.

Referring to FIG. 6, the aggregator 14 uses different connection tables 40 to track data at different time scales. A first connection table 49a is a time-slice connection table that operates on the smallest unit of time, e.g., (a time-slice). A time-slice can be e.g., less than 30 seconds to maybe several minutes. The time-slice connection table is the sum of records received from all collectors during that the time-slice period, corrected for duplicates.

Aggregator analysis algorithms 39 operate primarily on a short update period (SUP} Connection Table 49b, which is the sum of time-slices across a period of, e.g., 10 to 30 minutes. A set of SUP connection tables is summed into a third connection table 49c covering a long update period (LUP), e.g., 2 to 24 hours. For each recorded parameter (such as TCP bytes from host "A" to host "B"), SUP and LUP tables track both the sum and sum of squares of values of the recorded parameter. These two values allow the aggregator to compute both the mean and variance of the recorded parameter across the table's time period. Given "N" samples $x_1$, $x_2$, ... $x_n$, mean is sum over the period of the samples divided by the number of samples. The variance is derived from the mean and sum of squares.

At the end of each long update period, that period's values are merged into a profile connection table that includes historical information for the corresponding period of the week. Merging uses the equation below for each value in the profile table. For instance, a LUP table covering the period 12 pm to 6 pm on a Monday is merged into a profile table with historical information about Mondays 12 pm to 6 pm. Values in the profile table are stored as exponentially weighted moving averages (EWMAs). At time "t", a new value "$x_t$" (from the LUP table, for example) is added to the EWMA for time "t−1", denoted by "$m_{t-1}$", to generate a new EWMA value according to the following Equation:

$$m_t = \alpha x_t + (1-\alpha) m_{t-1}$$

where $\alpha$ can be tuned to trade off responsiveness to new values against old ones. EWMAs provide a concise way of representing historical data (both values and variance) and adapting to gradual trends. Recent data is compared to historical profiles from the same time of, an historical time span, e.g., a week because the week is the longest time span that generally shows well-defined periodicity in traffic patterns. By spanning a week, the approach covers diurnal cycles and week/weekend cycles. Recurring events with longer time periods, for example, monthly payroll operations, are less likely to show similarly well-defined patterns.

A collector 12 should handle relatively high rates of network traffic. As the network grows and traffic volume increases, additional collectors 12 can be deployed in appropriate locations to tap new network traffic.

Figure 7:
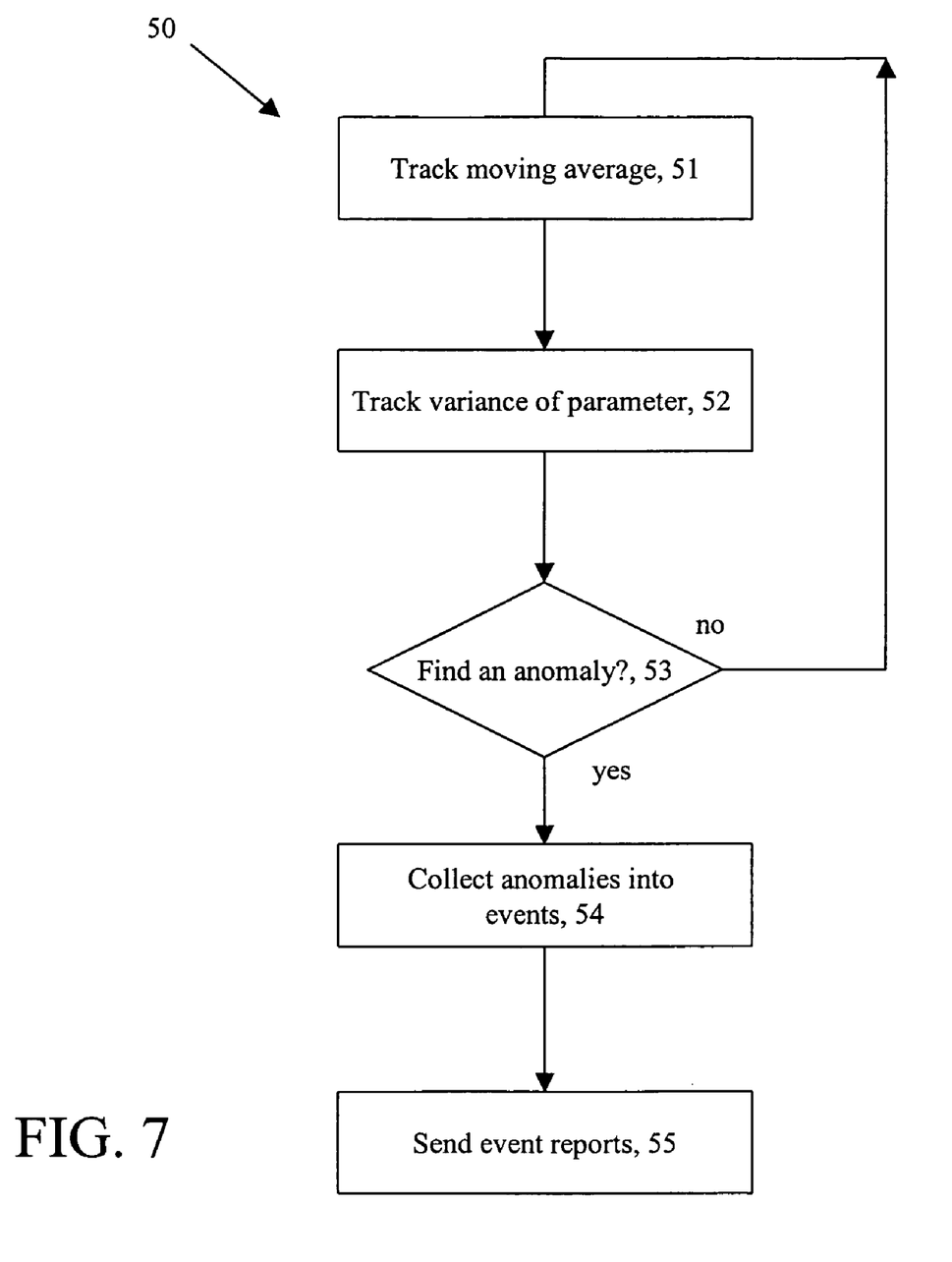
FIG. 7 is a flow chart depicting a generalized process for detection of anomalies and classification of events.

Referring to FIG. 7, a generic flow process 50 of an event detection process is shown. One characteristic of the generic flow process 50 is that in general the processes are historical and profile-driven. The generic flow process 50 tracks 51 a moving average that allow processes to adapt to slowly changing network conditions without user intervention. The generic flow process 50 also tracks 52 a variance of a parameter to allow the generic flow process 50 to account for burstiness in network traffic. Several of the algorithms can optionally be tuned via constants to alter parameters such as sensitivity. Historical analysis minimizes the amount of tuning that needs to be done. The benefits of historical analysis, therefore, are to decrease management complexity while improving analysis quality.

The generic flow process 50 operates at two conceptual levels, anomalies and events. The generic flow process 50 finds 53 anomalies, i.e., low-level discrepancies in the network, e.g., a host is receiving unusually high traffic, for example. Conventional intrusion detection would tend to report anomalies directly to the operator. This can be a problem because a single intrusion may correspond to many anomalies, and many anomalies are benign. In contrast, the system 10 using aggregator 14 collects anomalies into events 54. The operator is sent 55 event reports giving the operator more concise and useful information, while simplifying system management.

Figure 8:
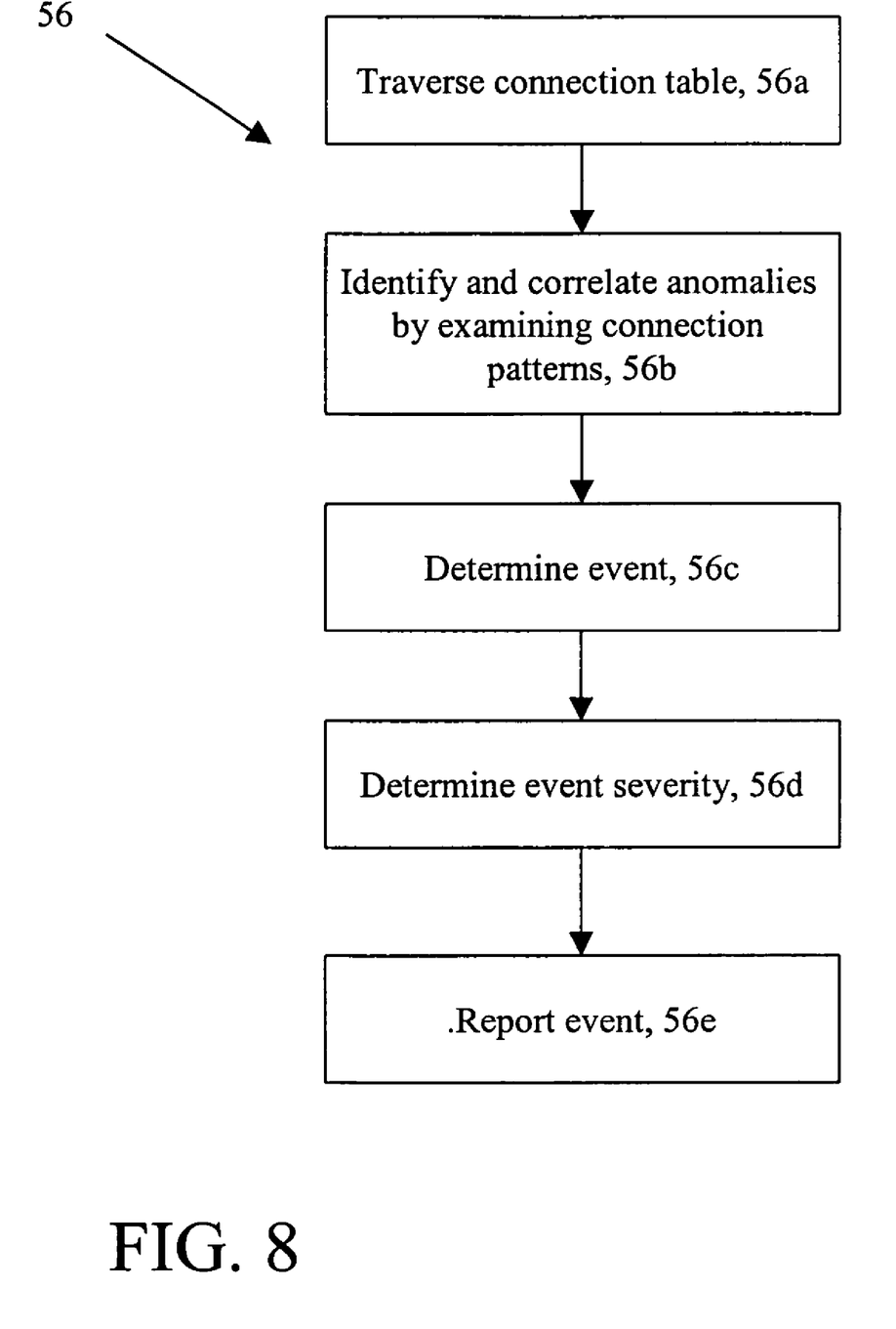
FIG. 8 is a flow chart depicting event processing.

Referring to FIG. 8, processes 39 handle events, i.e., high-level occurrences that have significance to a network administrator. The processes 39 distinguish among different classes of events. A general flow 56 that can underlie some of the processes 39, discover events by traversing 56a the connection table 40 and identifying 56b and correlating anomalies. From correlated anomalies events are produced 56c. For example, a DoS attack event may be identified because of an abnormal high level of traffic destined to some set of hosts. The generic flow process 50 examines connection patterns rather than packet signatures. Connection patterns can be more strongly correlated with a particular event. One type of event that is tracked by the aggregator 14 is new service detection.

Figure 9:
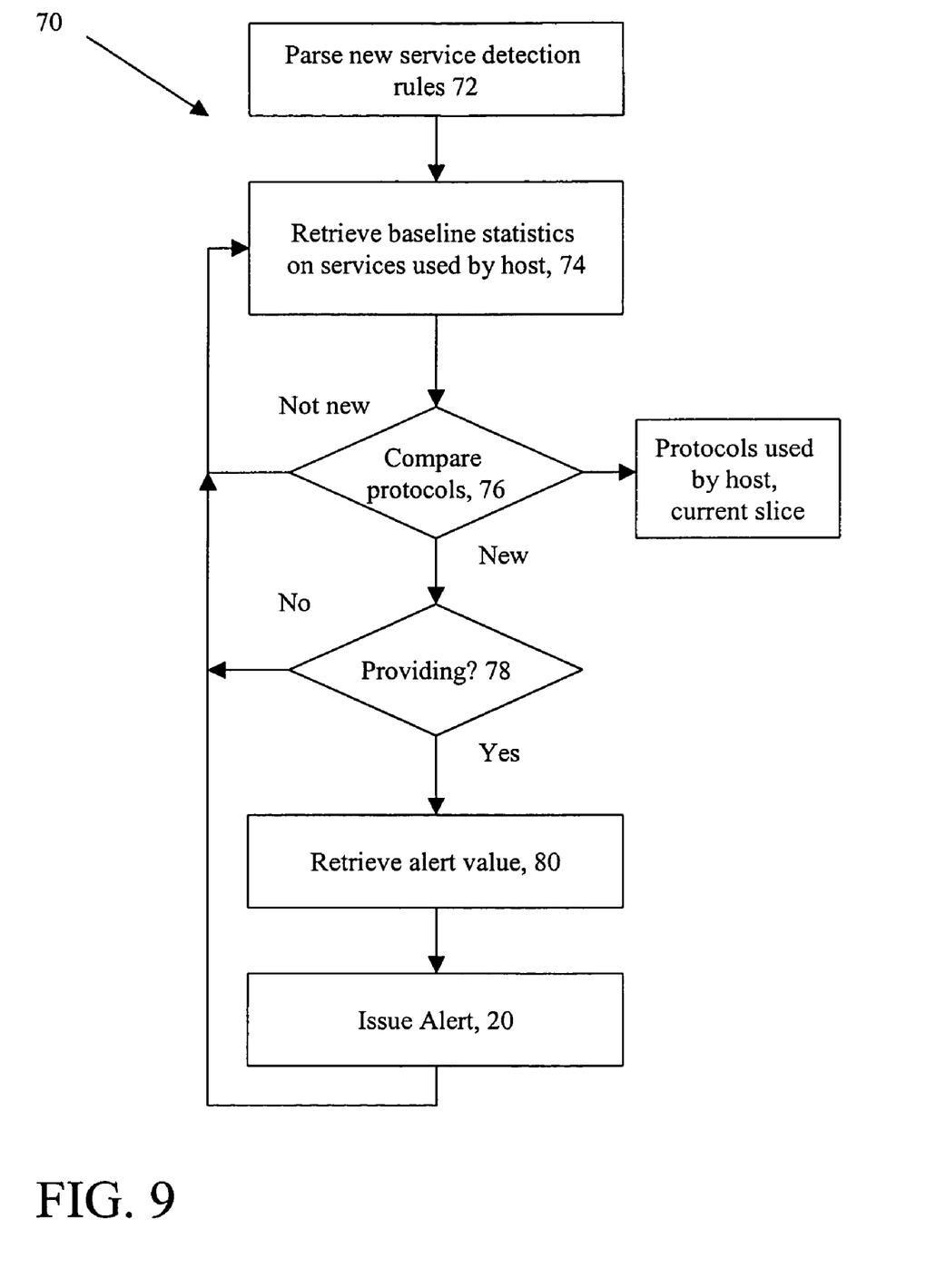
FIG. 9 is a flow chart depicting a new service detection processing

Referring to FIG. 9 the aggregator 14 can discover that a host or group of hosts is "providing" or "using" a service that is new to that host or group of hosts. A new service detection process 70 can be a stand-alone process or a rule-based event that is defined by specifying a series of conditions and assigning a severity level to a resulting event if the conditions are met. In this embodiment, the new service detection process is executed on the aggregator 14. Other arrangements are possible. The aggregator 14 determines the severity of each event based on how current traffic differs from the historical profile of the traffic. Upon detection, the aggregator 14 sends a message to indicate an alert.

The new service detection process 70 has parsed 72 one or more new service rules. An example of a rule is:

"If a specific host starts providing a new service that is unprecedented for that host alert with a severity of 100."

Figure 10:
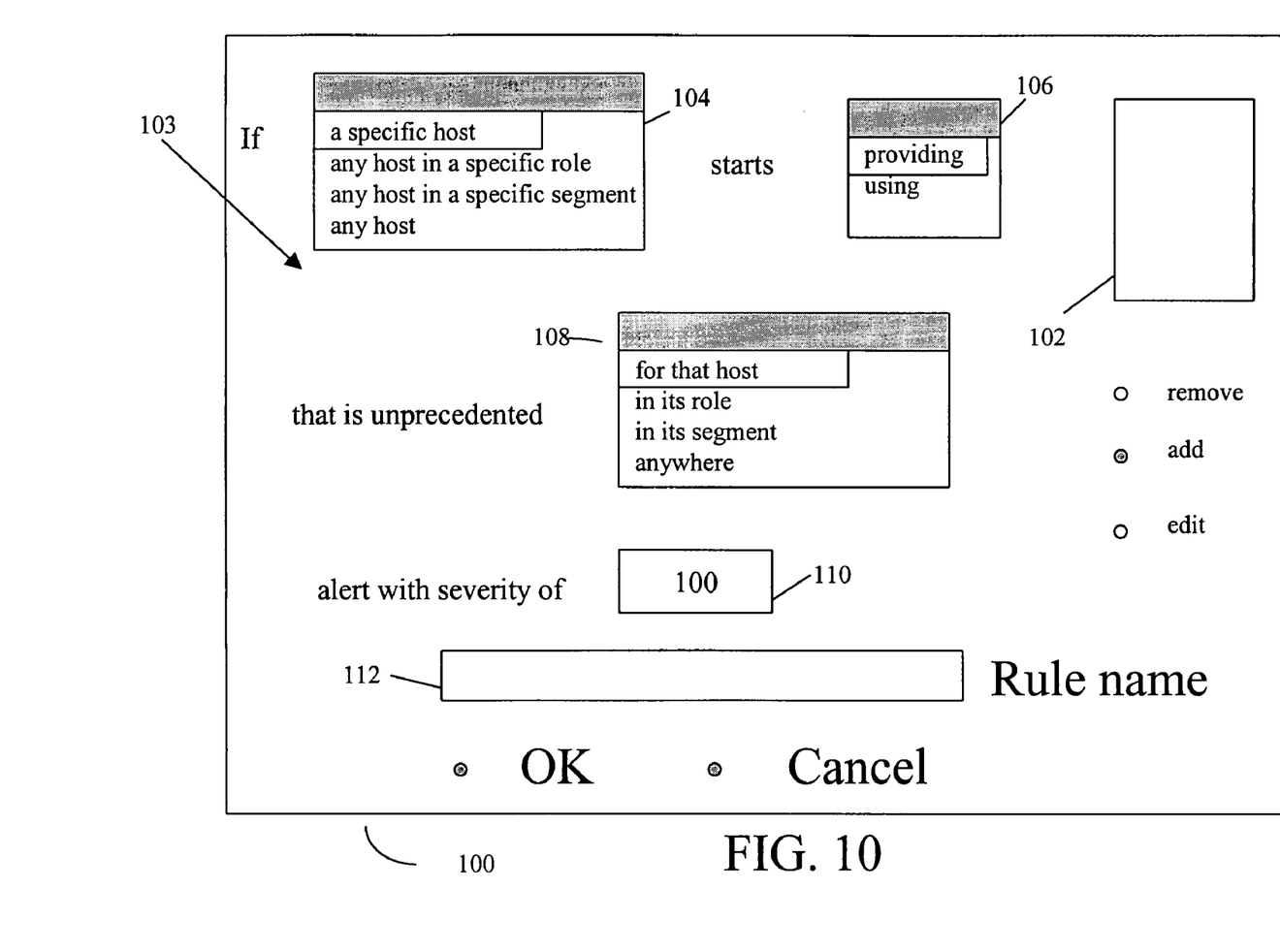
FIG. 10 depicts a screen for setting-up a new service detection process.

A user interface that produces the rule mentioned above as well as other rules is illustrated in FIG. 10. The process 70 retrieves a baseline value for the parameter corresponding to a unit being compared according to the parsing 72. For instance, for the rule mentioned above the process 70 parsed the rule to produce the following values:

specific host, <host id>
providing a new service <providing>
for that host <host id>
alert 100 <100>

The process 70 retrieves 72 a list of port protocols (services or ports) used by that host <host id> over a baseline period, which could be over a preceding week or so, by retrieving data for <host id> from the connection table.

As mentioned above contents of the host objects in the connection table 40 include a measure of the number of bytes, packets, and connections that occurred between hosts during a given time-period. The host object data are broken down on a per-protocol basis for every well-known transport protocol (e.g., TCP, UDP, ICMP, and the others defined by the "Internet Assigned Numbers Authority") and for several hundred well-known application-level protocols (e.g., SSH, HTTP, DNS,) and so forth.

The different connection tables 40 track data at different time scales. Thus, the current traffic can use statistics from the first connection table 49a, the time-slice connection table (FIG. 6) that operates on the smallest unit of time, e.g., (a time-slice, e.g., less than 30 seconds to maybe several minutes). The profile connection table can be used to provide the baseline historical information for the corresponding period of the week.

The process 70, e.g., forms a current list (not shown) of port protocols (services or ports) used by <host id> over the last time-slice and compares 76 the corresponding parameters, e.g., the port protocols used by the host from current traffic, e.g., the current time slice, against, e.g., a list (not shown) of the port protocols from the baseline. In this example, the above rule is violated if the host is "providing" a new service (rather than "using" a new service). In other embodiments, a don't care condition can exist for this feature in that the process will assert an alert for an event if the entity is either "using" or "providing" a new service. The process 70 thus is configured to determine if the <host id> is providing the new service by determining that the <host id> was sending traffic using the protocol(s) that were not in the list.

Accordingly, if the process 70 detects a difference in the lists of port protocols, and that the host id was sending traffic using a protocol that was not in the baseline list but was in the current time slice, the process 70 indicates that event to be that the <host id> is "providing" a "new service" and will retrieve 80 a value corresponding to the alert severity level set for violation of the rule. In this example, the value is 100. The process 70 issues 82 an alert with the value of 100 the alert being a message that is sent to a user to a user interface indicating that the specific rule has been violated.

The new service detection process 70 can configure rules to detect when a specific host, any host in a specific role, any host in a specific segment, any host, and so forth is "providing" or "consuming" a new service (using a new port protocol). Similarly, the extent of the comparison can be configured to determine if the new service is unprecedented for the selection (a specific host, any host in a specific role, any host in a specific segment, any host, and so forth) for that host, in its role, in its segment or anywhere in the network.

Referring to FIG. 10, a graphical user interface to produce a new service rule is shown. A link on a settings page (not shown) for instance can be used to bring a user to a page 100 for configuring the new service found rules. In this embodiment, the page 100 includes a list 102 of all of the rules that can exist in the aggregator 14. Next to the list is a "remove" button, which removes any highlighted rules (not shown). The page 100 also includes an "add" button (shown as enabled) that is operable with a rule configuration scheme 103 that has multiple pull-down menus 104, 106 and 108, as shown. While this is described as in a single page 100, of course multiple pages could be used. For instance selection of "Add" could launch a new page with the rule configuration scheme 103.

The example in FIG. 10 includes three pull-down menus and one text field 110 for the user to fill in. In the example, the pull-down menus refer to the hosts that the new service detection process would track. The page 100 can also include a box 112 to name the rule. In the example, the first pull down menu 104 includes choices such as "a specific host", "any host in a specific role", "any host in a specific segment" or "any host." The next pull-down menu 106 specifies whether the unit or entity selected in the first pull-down menu is either "providing" or "using" a new service. The next pull-down menu 108 specifies details about the extent of the comparison for that entity specified in the first pull-down. For instance, the extent can be for that "host", "in its role", "in its segment" or "anywhere" in the network. The field 110 allows the user to configure the severity level of the alert, e.g., a numeric between 1 and 100 (although other values can be used). A field 112 can be provided to name the rule. Alternatively, the system can assign a name to the rule or the user can be prompted to name the rule in a separate window.

When the user hits OK, if the user specified a specific host, role, or segment in the first pull-down, another, e.g., window pops up (not shown) allowing the user to select the specific host, role, or segment. A third button "Edit" can pre-populate the rule configuration scheme or launch a new window with the fields in the rule configuration scheme pre-populated with values corresponding to whichever rule was highlighted. The page can also include a cancel button.

The first pull-down 104 specifies the specificity of how much the user wants to track, whereas, the third pull-down 108 specifies how broad that rule should be applied. The rules are stored in the aggregator 14, and as the aggregator 14 traverses the connection table, it looks for violations of the rules. Other arrangements are possible.

A number of embodiments of the invention have been described. Nevertheless, it will be understood that various modifications may be made without departing from the spirit and scope of the invention.

What is claimed is:

1. A method for detection of a new service involving a host in a network, the method comprises:
    retrieving a baseline list of port and/or service protocols used by a host being tracked, the baseline list listing service and/or port protocols used by that host over a baseline period that is of a longer duration than a current period;
    retrieving a current list of service and/or port protocols for the current period used by the host being tracked;
    determining whether there is a difference in the protocols, by finding a protocol that was in the current list but was not in the baseline list; and if there is a difference;
    determining whether the host is providing or using the new service;
    determining if the host is sending traffic using a protocol not in the current list;
    identifying an alert rule corresponding to whether the host is providing or using the new service; and
    issuing an alert based at least on the identified alert rule and whether the host is providing or using the new service.

2. The method of claim 1 further comprising:
    retrieving a value corresponding to an alert severity level set for violation of the rule.

3. The method of claim 1 wherein a property of the host being tracked is that the host is at least one of a specific host, any host in a specific role, any host in a specific segment, or any host.

4. The method of claim 1 wherein the extent of the determining is configured for that host, in its role, in its segment or anywhere in the network.

5. The method of claim 1 wherein the baseline and current lists of protocols are provided from data in a connection table.

6. A computer program product residing on a computer readable medium for detection of new services in a network, the computer program product comprising instructions for causing a computer to:
    retrieve a baseline list of port and/or service protocols used by a host being tracked, the baseline list listing service and/or port protocols used by that host over a baseline period that is of a longer duration that a current period;
    aggregating communication information between every host pair;
    retrieve a current list of service and/or port protocols for the current period used by the host being tracked;
    determine whether there is a difference in the protocols, by identifying a protocol that was in a the current list but was not in the baseline list; and if there is a difference;
    determine whether the host is providing or using the new service;
    determining if the host is sending traffic using a protocol not in the current list;
    identify an alert rule corresponding to whether the host is providing or using the new service; and
    issue an alert based at least on the identified alert rule and whether the host is providing or using the new service.

7. The computer program product of claim 6 wherein instructions to indicate further comprise instructions to:
    issue an alert if the new service is detected.

8. The computer program product of claim 6 further comprising instructions to:
    retrieve a value corresponding to the alert severity level set for violation of the rule.

9. The computer program product of claim 6 wherein a property of the host being track is that the host is at least one of a specific host, any host in a specific role, any host in a specific segment, or any host.

10. The computer program product of claim 6 wherein the extent of the determining is configured to for that host, in its role, in its segment or anywhere in the network.

11. The computer program product of claim 6 further comprising instructions to:
    access a connection table to provide data for the baseline and current lists of protocols.

* * * * *